United States Patent [19]
McDonald et al.

[11] Patent Number: 6,064,529
[45] Date of Patent: May 16, 2000

[54] SPHERICAL ABERRATION CORRECTION USING FLYING LENS AND METHOD

[75] Inventors: Mark E. McDonald, Mountain View; Yu Chuan Lee, Cupertino, both of Calif.

[73] Assignee: Optiteck, Inc., Mountain View, Calif.

[21] Appl. No.: 09/109,111

[22] Filed: Jul. 2, 1998

[51] Int. Cl.[7] ................................................. G02B 27/14
[52] U.S. Cl. ......................... 359/637; 359/819; 359/823; 369/94; 369/44.15
[58] Field of Search ..................................... 359/368, 819, 359/823, 565, 664, 637, 811; 369/94, 44.15, 112, 110

[56] References Cited

U.S. PATENT DOCUMENTS

| | | | |
|---|---|---|---|
| 4,120,010 | 10/1978 | Mitsuya et al. | 360/103 |
| 4,419,701 | 12/1983 | Harrison et al. | 360/77 |
| 4,464,741 | 8/1984 | Compaan | 369/45 |
| 4,555,089 | 11/1985 | Donkin | 384/493 |
| 4,605,979 | 8/1986 | Inoue et al. | 360/105 |
| 4,620,251 | 10/1986 | Gitzendanner | 360/103 |
| 4,712,146 | 12/1987 | Moon et al. | 360/97 |
| 4,754,351 | 6/1988 | Wright | 360/97 |
| 4,754,353 | 6/1988 | Levy | 360/106 |
| 4,772,974 | 9/1988 | Moon et al. | 360/98 |
| 4,797,763 | 1/1989 | Levy et al. | 360/104 |
| 4,805,055 | 2/1989 | Wright | 360/106 |
| 4,823,216 | 4/1989 | Atesmen et al. | 360/103 |
| 4,843,502 | 6/1989 | Tagawa | 360/105 |
| 4,972,279 | 11/1990 | Atesman et al. | 360/103 |
| 4,992,898 | 2/1991 | Wanlass | 360/104 |

(List continued on next page.)

FOREIGN PATENT DOCUMENTS

| | | | |
|---|---|---|---|
| 0 727 777 | 8/1996 | European Pat. Off. | G11B 7/12 |
| 8-212579 | 8/1996 | Japan | G11B 7/135 |
| 8-221773 | 8/1996 | Japan | G11B 7/09 |
| 8-221790 | 8/1996 | Japan | G11B 7/135 |
| 8-315404 | 11/1996 | Japan | G11B 7/135 |
| 96/27873 | 9/1996 | WIPO | G11B 5/127 |
| 98/09285 | 3/1998 | WIPO | G11B 11/10 |

OTHER PUBLICATIONS

Osato, et al. "A rewritable optical disk system with over 10 GB of capacity", 1998, Tech. Digest Ser., Optical Data Storage, May 10–13, 1998 Conference Edition, vol. 8, 3 pages.

Ichimura, et al., "High–Density optical Recording using a Solid Immersion Lens", Jul. 1, 1997, Applied Optics, vol. 36, No. 19, pp. 4339–4348.

Yamamoto, et al., "0.8 Numerical–Aperture Two–Element Objective Lens for the Optical Disk", Jan. 1997, Japan J. Phys., vol. 36, pp. 456–459.

Davies, David H., "Storage and Retrieval Systems and Application", Feb. 13–15, 1990, Proceedings, The International Society for Optical Engineering, Santa Clara, California, vol. 1248, pp. 96–103.

Hasegawa et al., "Extended Capacity and High Speed Magnetic Field Modulation Recording for 3.5" Magnetooptical Disk., Jun. 1993, IEEE Translation Journal of Magnetics in Japan, vol, 8, No. 6, pp. 396–404.

Kino, G. S., "Near–Field Optical Storage", Nov. 1997, Optical & Photonics News, pp. 38–39.

Hasegawa, et al., "Extended Capacity and High Speed Magnetic Field Modulation Recording for 3.5" Magnetooptical Disk, Jun. 1993, IEEE Translation Journal of Magnetics on Japan, vol. 8, No. 6, pp. 396–404.

Yamaguchi et al., "New Flying Optical Head for High Speed Accessing", 1990, SPIE vol. 1248, Storage and Retrieval Systems and Applications, pp. 96–103.

*Primary Examiner*—Loha Ben
*Attorney, Agent, or Firm*—Sierra Patent Group

[57] ABSTRACT

An optical access device for a moving optical data storage media having a flying lens near an outer surface of the media, and an objective lens spaced from the flying lens, with the flying lens and objective lens co-operating to substantially offset a variable range of negative spherical aberration occurring in the media by forming a positive spherical aberration which substantially cancels the negative spherical aberration.

84 Claims, 5 Drawing Sheets

U.S. PATENT DOCUMENTS

| | | | |
|---|---|---|---|
| 5,012,369 | 4/1991 | Owe et al. | 360/104 |
| 5,055,959 | 10/1991 | Saliba | 360/11 |
| 5,079,657 | 1/1992 | Aronoff et al. | 360/103 |
| 5,081,553 | 1/1992 | Wanlass et al. | 360/103 |
| 5,086,360 | 2/1992 | Smith et al. | 360/103 |
| 5,095,613 | 3/1992 | Hussinger et al. | 29/603 |
| 5,097,370 | 3/1992 | Hsia | 360/103 |
| 5,105,408 | 4/1992 | Lee et al. | 360/44.15 |
| 5,112,662 | 5/1992 | Ng | 428/64 |
| 5,125,750 | 6/1992 | Corle et al. | 359/819 |
| 5,157,555 | 10/1992 | Reno | 359/823 |
| 5,202,875 | 4/1993 | Rosen et al. | 369/94 |
| 5,210,929 | 5/1993 | von Huene et al. | 29/603 |
| 5,268,805 | 12/1993 | Peng et al. | 360/106 |
| 5,282,190 | 1/1994 | Maruo et al. | 369/115 |
| 5,313,445 | 5/1994 | Wada et al. | 369/53 |
| 5,379,171 | 1/1995 | Morehouse et al. | 360/10.5 |
| 5,497,359 | 3/1996 | Mamin et al. | 369/44.15 |
| 5,508,857 | 4/1996 | Horita | 360/75 |
| 5,535,073 | 7/1996 | Brezoczky et al. | 360/105 |
| 5,535,075 | 7/1996 | Takahashi et al. | 360/105 |
| 5,590,095 | 12/1996 | Chaya | 369/13 |
| 5,610,901 | 3/1997 | Best et al. | 369/275.1 |
| 5,619,371 | 4/1997 | Pontius | 359/368 |
| 5,636,085 | 6/1997 | Jones et al. | 360/103 |
| 5,671,203 | 9/1997 | Ra | 369/58 |
| 5,677,903 | 10/1997 | Holtslag et al. | 369/112 |
| 5,684,780 | 11/1997 | Ando | 369/110 |
| 5,703,862 | 12/1997 | Lee et al. | 369/112 |
| 5,708,641 | 1/1998 | Choi et al. | 369/112 |
| 5,708,643 | 1/1998 | Choi et al. | 369/112 |
| 5,712,842 | 1/1998 | Yamamoto et al. | 369/112 |
| 5,729,393 | 3/1998 | Lee et al. | 359/819 |
| 5,729,522 | 3/1998 | Akama et al. | 369/112 |
| 5,734,512 | 3/1998 | Shin et al. | 359/637 |
| 5,745,304 | 4/1998 | Choi | 359/719 |
| 5,764,613 | 6/1998 | Yamamoto et al. | 369/112 |
| 5,777,970 | 7/1998 | Kajiyama et al. | 369/94 |
| 5,793,720 | 8/1998 | Nishikata | 369/44.25 |
| 5,809,000 | 9/1998 | Choi | 369/112 |
| 5,815,470 | 9/1998 | Ohmori et al. | 369/13 |
| 5,828,512 | 10/1998 | Wada et al. | 369/75 |

SPHERICAL ABERRATION CORRECTION USING FLYING LENS AND METHOD

CROSS REFERENCE TO RELATED APPLICATIONS

This application is related to application Ser. No. 09/016, 213, filed Jan. 30, 1998, application Ser. No. 09/016,382, filed Jan. 30, 1998, and application Ser. No. 09/071,478, filed May 1, 1998.

FIELD OF THE INVENTION

The present invention relates to optical focusing, and more particularly to the correction of spherical aberration for data storage media.

BACKGROUND OF THE INVENTION

The use of optical data storage disks having a single data storage layer is known. Such disks include, for example, compact disks (CDs) and CD-ROMs, magneto-optical disks (M/O), and some digital video disks (DVD). More recently it has been proposed that optical data storage disks be increased in storage capacity by having multiple data storage layers, and limited use of two layers has been introduced on the market. Such multilayer disks would have a plurality of inner data storage layers and an outer protective layer for protecting the data storage layers from scratches and dust.

In such storage disk systems, a focused beam of light is reflected from a modulation at a point in a data storage layer, such as a pit, magneto optical bit, phase change bit, or dye polymer bit, and the way in which the beam is reflected determines the value of the data stored at that point.

It is also known that both the data storage layer and protective layer cause a spherical aberration to the light accessing both layers, which is different for different data layers, and which distorts the beam which accesses the data layer. Hence, lens systems which access the optical information must correct for spherical aberration in order to increase the density of data in the disks.

In the past, such lens systems have required different lenses corresponding to different thicknesses of the protective layer, and thus can not be used for varying thicknesses of the protective layer. In addition, such lens systems have required complex structures to access the multiple data layers such as more than one actuator with a corresponding motor for use on more than one movable lens. Other prior lens systems have not been able to access more than two different storage layers of the media.

All of these factors have resulted in an unduly complicated structure for the prior lens systems.

SUMMARY OF THE INVENTION

The present invention relates to an optical access device for a moving optical storage media. The invention comprises a flying lens near an outer surface of the media, and an objective lens spaced from the flying lens. The flying lens and objective lens co-operate to substantially offset a variable negative spherical aberration occurring in the media by forming a positive spherical aberration which substantially cancels the negative spherical aberration.

BRIEF DESCRIPTION OF THE INVENTION

Briefly, and in general terms, the present invention provides an improved device for accessing an optical storage media, which provides a method simultaneously to focus to different depths of a medium and to correct for optical spherical aberration by adjusting an objective lens of the device. With the present invention, the objective lens co-operates with a corrector lens situated between the objective lens and the medium, and at a relatively fixed distance near the outer surface of the optical storage medium so that focus and spherical aberration may be adjusted simultaneously in a simplified manner by moving the objective lens. With the present invention, the depth of the storage layer which may be accessed by the device is increased, and the device may access a range of depths In the storage layer.

The optical access device further provides improved access to data in moving optical storage media. The device both may read optical information from the storage media, or store optical information in the storage region of the media. The device further provides access to data in the storage region in a more accurate manner.

Simultaneous depth selection and spherical aberration correction is accomplished by maintaining a corrector lens at a fixed distance away from an outer surface of the media and an objective lens spaced at a variable distance from the corrector lens. The corrector lens and objective lens co-operate to substantially offset a variable negative spherical aberration occurring in the media by forming a positive spherical aberration which substantially cancels the negative spherical aberration.

At nominal separation distance, the corrector lens and the objective lens correct for a fixed amount of spherical aberration. Variations about this nominal distance correct for dynamic spherical aberration. The objective lens moves relative to the corrector lens to access different depths of the storage region. The lens system also accommodates different thicknesses of the protective layer.

In certain embodiments, the corrector lens takes the form of the flying lens situated near the surface of the medium. The flying lens is kept at a relatively fixed distance from the surface using an air bearing system, even in the event of a tilt of the media, without the use of complicated servo control algorithms and electronics. Generally, the distance between the flying lens and the outer surface of the media is dependent upon the speed of the media relative to the correcting lens. In preferred form, only one actuator corresponding to one movable lens is required in the operation of the device.

In certain embodiments, the device has an air bearing system comprising a slider having the flying corrector lens recessed from an inner or outer surface of the slider. Alternatively, the lens could protrude out of the outer surface. The slider preferably has a beveled leading end on each side for air flow and life. The system can also have a device for biasing or preloading the slider towards the outer surface of the media.

In a presently preferred form, by way of example and not necessarily by way of limitation, the storage media comprises a storage region with a plurality of data layers, and an outer protective layer to cover said storage region.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons. For example, although the invention is described as accessing a disk, it will be understood that different optical storage media may be used, such as a flexible endless belt or tape.

Figure 1:
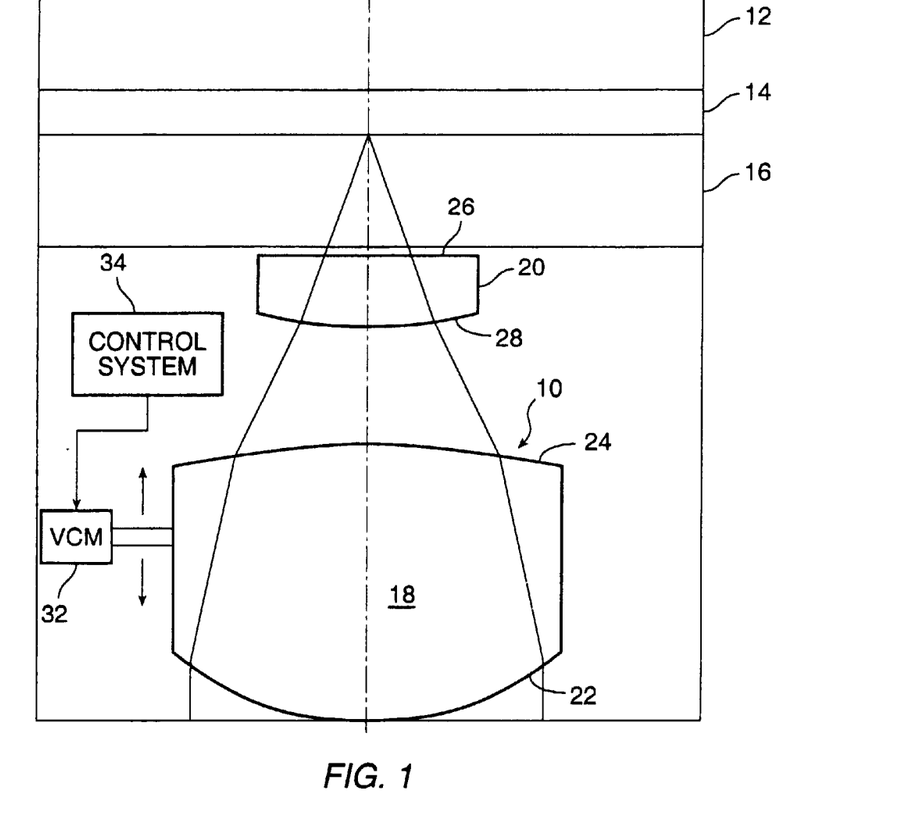
FIG. 1 is a diagrammatic view of an optical access device of the present invention.
Figure 2:
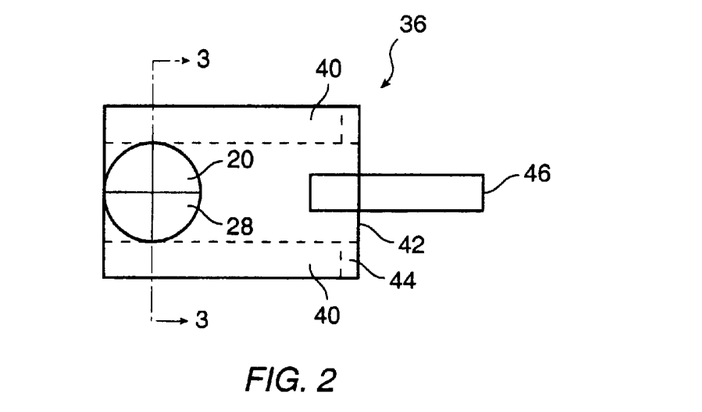
FIG. 2 is a plan view of a flying lens for the device of the present invention.
Figure 3:
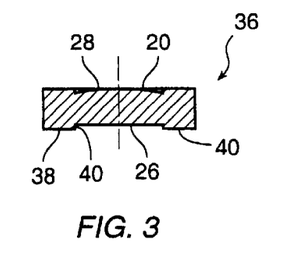
FIG. 3 is a sectional view taken substantially as indicated along the line 3—3 of FIG. 2.
Figure 4:
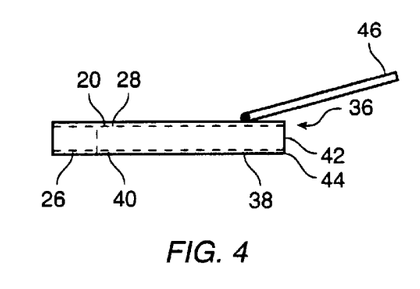
FIG. 4 is an elevational view of the flying lens of FIG. 2.

Referring now to FIG. 1, there is shown an optical access device generally designated 10 for use with a moving optical storage media, such as a rotating optical disk 12 which is removable or fixed in the device 10. The disk 12 is preferably of the type having an optical data storage region 14 having a plurality of data layers of digital optical information, and a protective layer 16 covering the storage region 14 to prevent scratching of the storage region 14 and dust on the storage region 14.

As known to the art, the accessing of information in the disk 12 is accompanied by a negative spherical aberration in both the storage region 14 and protective layer 16 which distorts the beam which accesses the information.

The device 12 has an outer objective lens 18 and an inner flying spherical aberration corrector lens 20 positioned near the disk 12 intermediate the objective lens 18 and the disk 12. The disk 12 is typically in the far field of the lens. The objective lens 18 preferably has an aspheric outer surface 22 and an opposed inner aspheric surface 24. The corrector lens 20 has a generally planar inner surface 26 facing the disk 12, and a convex outer surface 28 facing away from the disk 12, which is preferably spherical, or it may be aspherical, e.g., for special correction of disk tilt. The objective lens has an optimal thickness, but it has been found that the objective lens 18 performs satisfactorily if the thickness is in a range of about 30 $\mu$m greater than or less than the optimal thickness.

The surfaces of the objective lens 18 and the corrector lens 20 are selected to form a positive spherical aberration, which offsets the negative spherical aberration caused by the disk 12, as well as focusing on a given data layer in the disk 12. Thus, the two lenses simultaneously result in the correction of spherical aberration as they focus a beam on the selected data layer. The corrector lens 20 corrects for a dynamic spherical aberration in the storage region 14 of the disk 12, while the objective lens 18 corrects for a fixed spherical aberration in the disk 12. In accordance with a preferred embodiment of the present invention, variable thicknesses of the protective layer 16 may be used in the disk 12, such as in the range of about 0.6 mm to about 1.2 mm, while the depth of accessing information in the storage region 14 may be in the range of about 0.0 mm to about 1.0 mm from an outer surface of the storage region 14. In a preferred form, the corrector lens 20 is positioned slightly away from an outer surface 30 of the disk 12 in the range of about 50 $\mu$m to about 200 $\mu$m. Situating the corrector lens 20 close to the disk 12 increases the depth over which spherical aberration tolerances can be met, and increases disk tilt tolerances.

As shown, the objective lens 18 has an associated actuator 32, such as a voice coil actuator, or voice coil motor (VCM), known to the art, which moves the objective lens 18 relative to the corrector lens 20. In this manner, the lens assembly may access different depths or data layers of the storage region 14 by simply actuating the actuator 32 which moves the objective lens, as controlled by a suitable control system 34, such as a digital signal processor (DSP). The objective lens 18 may also be moved by the actuator 32 in order to simultaneously modify the spherical aberration and focusing. As will be seen below, the corrector lens 20 is positioned at a nearly constant distance from the outer surface 30 of the disk 12 so that the focus position and spherical aberration can be linked, such that a separate control for spherical aberration and focusing is not required.

In a preferred form, as shown in FIGS. 1–4, the device 10 has a slider 36 having the flying corrector lens 20 recessed from an inner surface 38 and outer surface of the slider 36 in order to protect the inner and outer surfaces of the corrector lens 20, and the corrector lens 20 may be recessed from an outer surface of the slider 36, if desired. The slider 36 and corrector lens 20 are preferably of one-piece construction, and may be molded from a plastic material, such as polycarbonate or acrylic, although they may be separate pieces assembled together. The slider 36 has an air bearing system comprising a pair of opposed slider members 40 to house the corrector lens 20. Also, a leading end 42 of the slider 36 has a bevel 44 adjacent the inner surface 38 of the slider 36. The leading end 42 of the slider 36 is directed towards the direct air stream of the angular motion of the moving disk 12 or tape. The slider 36 also has a biasing or preloading suspension system 46, such as a leaf spring, which biases or preload the slider 36 towards the outer surface 30 of the disk 12. The height of flying and offset can be controlled by the design of the suspension system relative to the slider 36. In an alternative form, the maintained height of the corrector lens 20 may be accomplished by a holding device for the lens 20, such as a frame.

In use, the rapidly rotating disk 12 creates a moving air stream or cushion adjacent its moving outer surface 30 which is directed beneath the inner surface 38 of the slider 36 by the air bearing system 44, in order to maintain the slider 36, and thus the corrector lens 20, at a fixed distance away from the outer surface 30 of the disk 12. This spaced apart distance is dependent upon the air speed induced by the rotating disk. Thus, during normal operation of the disk 12 rotating at a certain speed, the corrector lens 20 is spaced nearly a constant distance from the disk 12. The slider members 40 contact or nearly contact the outer surface 30 of the disk 12 at a slow or zero speed of the rotating disk 12 due to the biasing or preloading of the flying lens 20 towards the disk 12.

Figure 5:
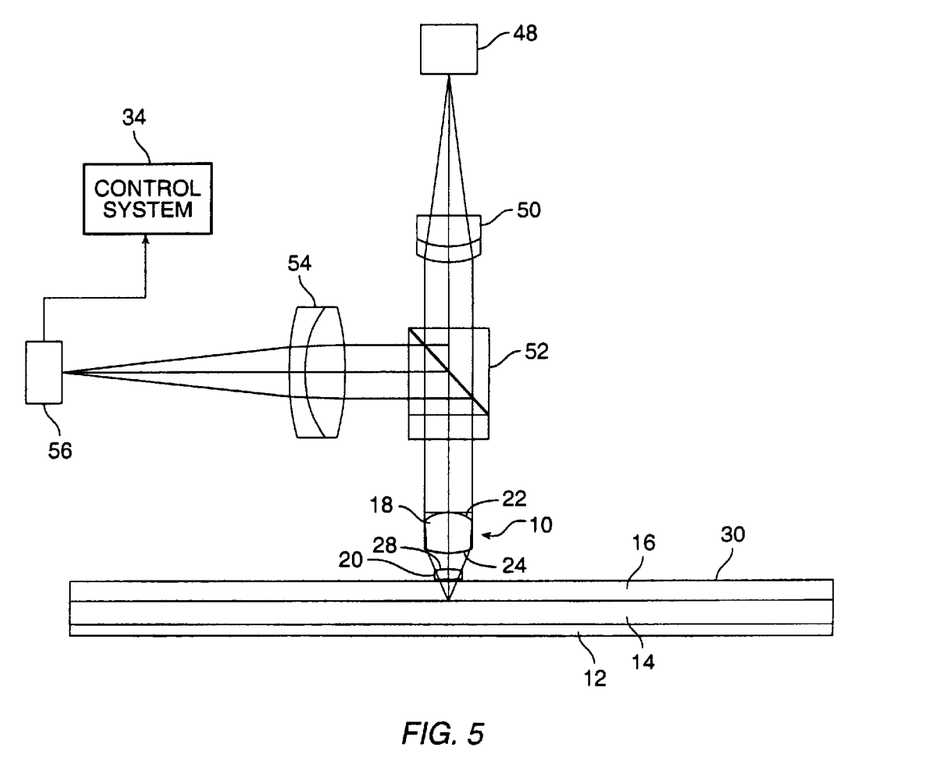
FIG. 5 is a diagrammatic view of an optical system using the optical access device of FIG. 1.

As shown in FIG. 5, the device 10 has a light source 48, such as a laser, and is first auxiliary lens 50 which collimates the light beam from the source 48. The beam then passes through a beam splitter 52, and then it passes through the objective lens 18 and corrector lens 20 into the disk 12. Light reflected from the storage region 14 of the disk 12 then passes through the corrector lens 20 and objective lens 18 to the beam splitter 52 after which it passes through a second auxiliary lens 54 which is focused upon a suitable photodetector 56 where the optical information may be interpreted by the control system 34. In one form, the device 10 may be used in the form of a pick-up device in order to read information contained in the storage region 14 of the disk 12. In an alternative form, the device 10 may be used to store optical information in the storage region 14 of the disk 12 by using, for example, a more powerful laser than required for reading as the light source 48, or a different wavelength. Other methods for storing or recording are possible. The device 10 may be used for reading only, recording only, or both recording and reading.

Thus, in accordance with the invention, the device 10 simultaneously corrects for spherical aberration and focusing by merely using the optical lens 18 and the flying lens 20. Different layers of the optical data storage region may be accessed in the disk 12 by merely moving the objective lens 18 relative to the flying lens 20. Thus, the device 10 of the present invention is of simplified construction, and provides improved results.

Figure 6:
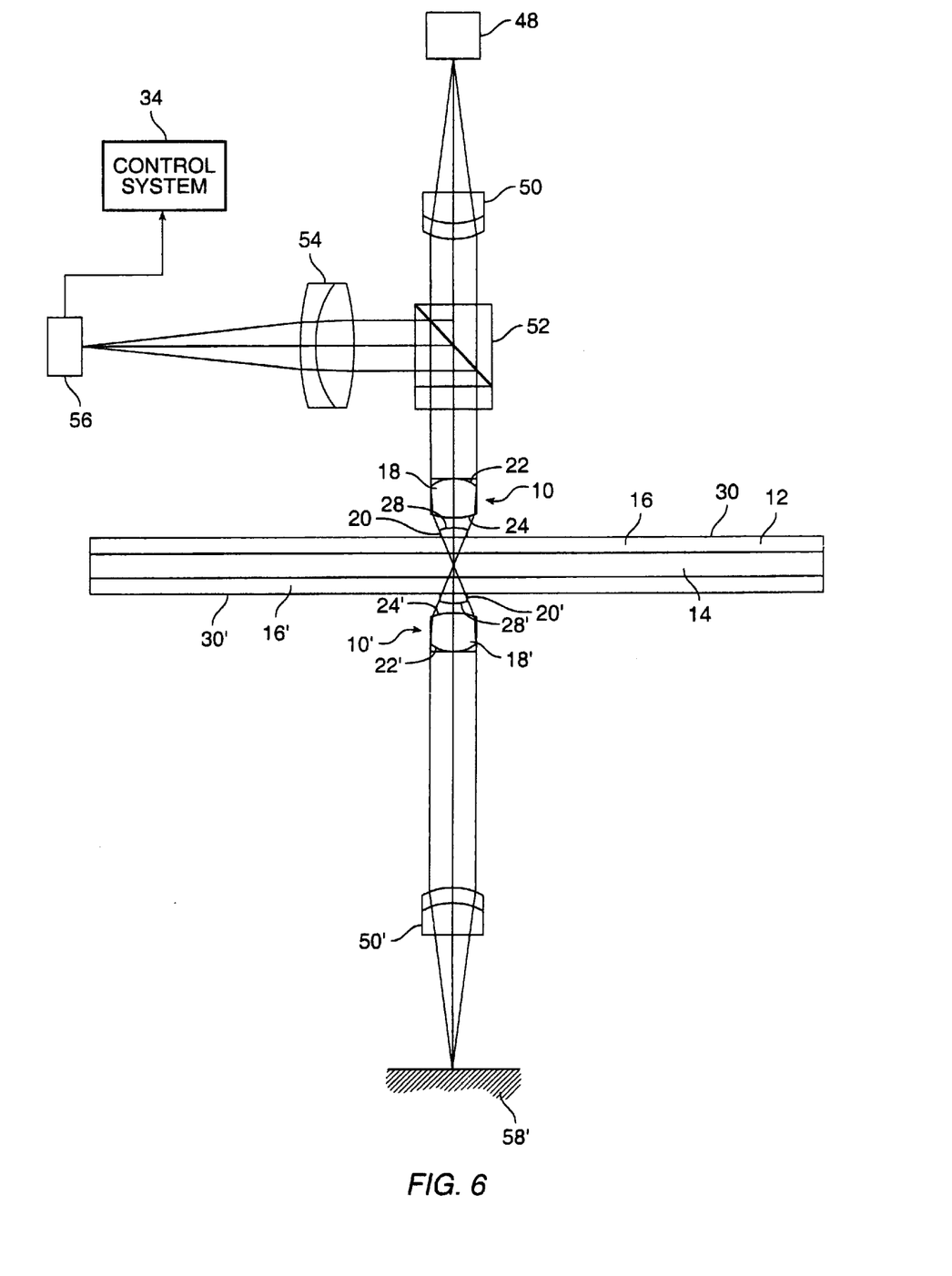
FIG. 6 is a diagrammatic view of another embodiment of the device of the present invention.

A device 10 and 10' for generating reflective microholograms is illustrated in FIG. 6, in which like reference numerals designate like parts. In this embodiment, the device 10 has a structure as previously described in connection with FIGS. 1–5 adjacent the outer surface 30 of the disk 12. In addition, the device 10' has a flying corrector lens 20' including a slider flying at a fixed position near an opposite outer surface 30' of the disk 12. The device 10' also has an objective lens 18' spaced from the corrector lens 20', and an auxiliary lens 50' to focus the light beam on the outer surface of a mirror 58'.

In use, the device 10 and 10' of FIG. 6 has a laser source 48 forming a light beam which passes to the collimator lens 50 and to the beam splitter 52. After that, the beam passes through the objective lens 18 and corrector lens 20. The beam then passes through the disk 12 to the second flying corrector lens 20' near the opposed surface 30' on the opposite side of the disk 12. After that, the beam passes through the second objective lens 18' to the auxiliary lens 50' which focuses the beam on the outer surface of the mirror 58'. The beam is reflected by the mirror 58', and again passes through the second collimator auxiliary lens 50', the second objective lens 18' and second corrector lens 20' where the beam is focused in the storage region 14 of the disk 12 in the vicinity of the focused beam from the device 10 in the storage region 14. At this point or area, the two opposed beams form an interference pattern having dark and light areas, and, in the present case, the interference pattern forms reflection microholograms in the storage region 14 which serves later as a representation of stored data. The device 10 previously described in connection with FIGS. 1–5 is used in order to read the information which has been generated in the storage region 14 of the disk 12 by the device of FIG. 6.

Figure 7:
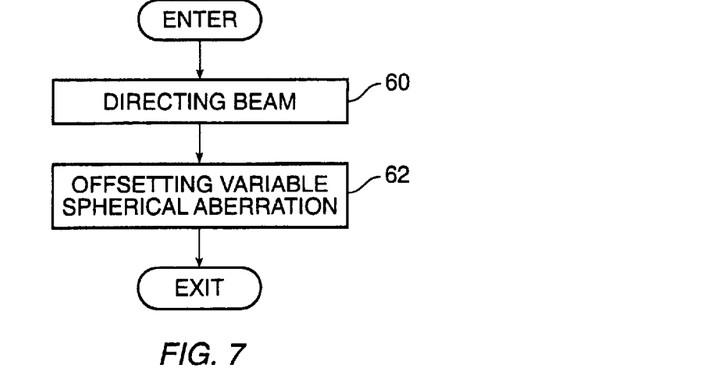
FIGS. 7–10 are flow charts of methods according to the present invention.

As shown in FIG. 7, a method of the present invention of accessing a moving optical media comprises the steps of directing a light beam into the media 60, and offsetting a variable negative spherical aberration occurring in the media by forming a positive spherical aberration of reflected light from the media which substantially cancels the negative spherical aberration 62.

Figure 8:
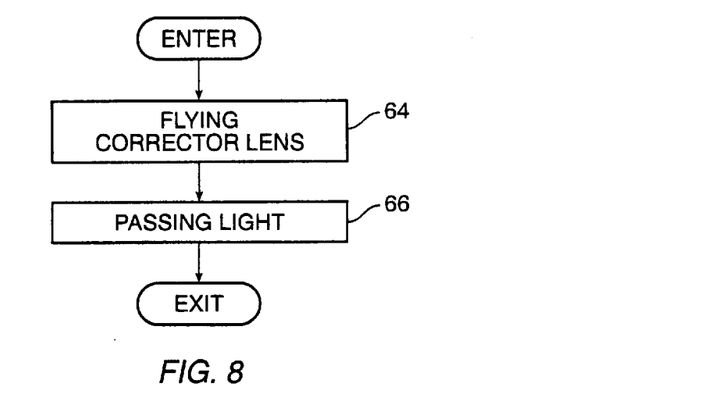

As shown in FIG. 8, another method of the present invention of accessing a moving optical storage media comprises the steps of flying a corrector lens at a nearly constant distance away from an outer surface of the media to pass light and correct for spherical aberration 64, and passing light received by the corrector lens through an objective lens to further correct for spherical aberration 66.

Figure 9:
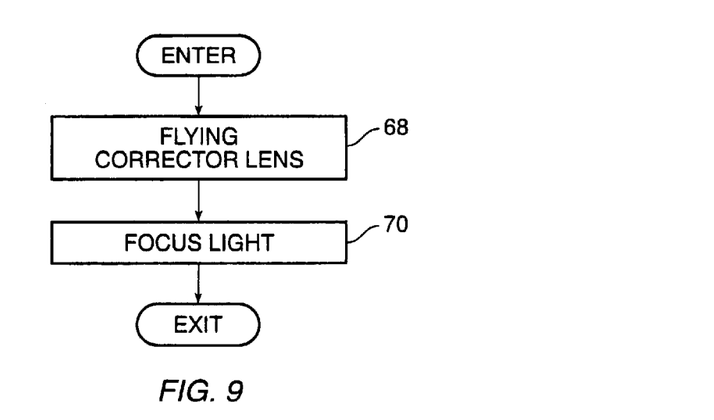

As shown in FIG. 9, a further method of the invention of accessing a moving optical storage media comprising the steps of flying a corrector lens at a nearly constant distance away from an outer surface of the media to pass light and correct for spherical aberration 68, and passing light received from the corrector lens through an objective lens to correct for spherical aberration and focus on a given data layer 70.

Figure 10:
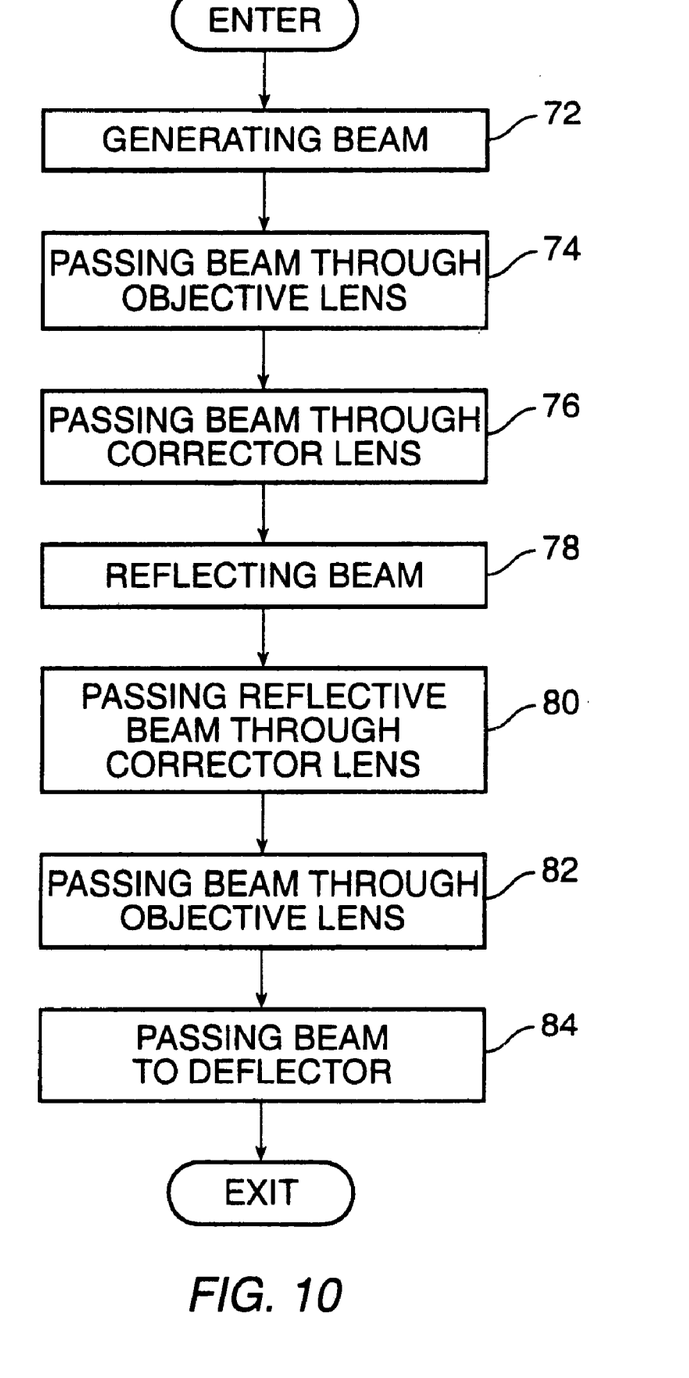

As shown in FIG. 10, a method of the invention of accessing a moving optical storage media comprises the steps of generating a beam of light from a source of light 72, passing the beam through an objective lens 74, passing the beam through a corrector lens 76, reflecting the beam from a data storage layer in the media 78, passing the reflected beam through the corrector lens 80, passing the beam through an objective lens 82, and passing the beam to a detector which is responsive to light 84.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims. For example, although the device 10 has been described for use on a rotating disk media, it may be used in connection with other media, such as a biological media.

What is claimed is:

1. An optical access device for a moving optical storage media, comprising:

a flying lens near an outer surface of said media; and an objective lens spaced from the flying lens, said flying lens and objective lens co-operating to substantially offset a variable range of negative spherical aberration occurring in said media by forming a positive spherical aberration which substantially cancels said negative spherical aberration.

2. The device of claim 1 wherein said media includes a data storage region covered by a protective layer of preselected variable thickness.

3. The device of claim 2 wherein the thickness of said protective layer is in the range of about 0.6 mm to about 1.2 mm.

4. The device of claim 2 wherein the depth of accessing information in the data storage region of said media is in the range of about 0.0 mm to about 1.0 mm from an outer surface of the data storage region.

5. The device of claim 1 further comprising a moving device for moving the objective lens relative to said flying lens.

6. The device of claim 1 wherein said flying lens has an inner generally planar surface facing said outer surface of the media.

7. The device of claim 6 wherein said flying lens has a convex outer surface facing away from the outer surface of said media.

8. The device of claim 7 wherein said outer surface of the flying lens is substantially spherical.

9. The device of claim 7 wherein said outer surface of the flying lens is aspherical.

10. The device of claim 1 wherein said objective lens is aspherical.

11. The device of claim 1 wherein said flying lens is positioned at a nearly constant height spaced away from said outer surface of said media.

12. The device of claim 1 wherein said device records information in said media.

13. The device of claim 12 wherein the information in said media is at a selected depth.

14. The device of claim 1 wherein said device reads information previously stored in said media.

15. The device of claim 14 wherein the information is at a selected depth in said media.

16. The device of claim 1 including a slider with an air bearing system positioned at a relatively constant distance spaced away from said outer surface of the media, said flying lens being positioned on said slider.

17. The device of claim 16 further comprising a suspension system to preload said slider towards the outer surface of said media.

18. The device of claim 17 wherein the preloading device comprises a suspension system having a leaf spring.

19. The device of claim 16 wherein said flying lens is recessed from an inner surface of said slider facing said media.

20. The device of claim 1 including a source of light and a first auxiliary lens which collimates the light source for said objective lens.

21. The device of claim 20 wherein said light source comprises a laser.

22. The device of claim 20 including a beam splitter located intermediate said first auxiliary lens and said objective lens, and a light detector for receiving light from said beam splitter.

23. The device of claim 22 further comprising a second auxiliary lens located intermediate said beam splitter and said detector to focus light received from the beam splitter onto the detector.

24. The device of claim 1 wherein said media comprises a rotating disk.

25. An optical access device for an optical storage media which is removable or fixed in the device, comprising:
   a corrector lens;
   a device for maintaining the corrector lens at substantially the same distance from an outer surface of the media; and
   an objective lens spaced from the corrector lens, said corrector lens and objective lens co-operating to substantially offset a variable range of negative spherical aberration occurring in said media by forming a positive spherical aberration which substantially cancels said negative spherical aberration.

26. An optical access device for an optical storage media, comprising:
   a flying lens near an outer surface of said media;
   a device for preloading the flying lens towards the outer surface of said media; and
   an objective lens spaced from the flying lens, said flying lens and objective lens co-operating to substantially offset a variable range of negative spherical aberration occurring in said media by forming a positive spherical aberration which substantially cancels said negative spherical aberration.

27. The device of claim 26 further comprising a slider with an air bearing system for retaining the flying lens.

28. The device of claim 27 wherein the slider with the air bearing system is spaced at approximately a constant distance from the outer surface of said media when the media is in motion relative to the lens.

29. The device of claim 27 wherein an inner surface of said slider contacts the outer surface of the media when the media is at rest or in a condition of slow motion.

30. The device of claim 29 wherein the flying lens is spaced from an inner surface of said slider.

31. An optical access device, comprising:
   a slider with an air bearing system having an inner surface; and
   a corrector lens retained by said slider and being spaced from said inner surface of said slider.

32. The device of claim 31 including a pair of spaced slider members of an air bearing system defining the inner surface of the slider, said corrector lens being located intermediate said slider members.

33. The device of claim 31 wherein the slider has a beveled end adjacent said inner surface.

34. The device of claim 31 wherein said slider and corrector lens are of one-piece construction.

35. The device of claim 31 wherein said slider and corrector lens are separate pieces.

36. The device of claim 31 wherein an inner surface of said corrector lens is approximately planar, and in which an outer surface of said corrector lens is convex.

37. The device of claim 36 wherein the outer surface of said corrector lens is spherical.

38. The device of claim 36 wherein the outer surface of said corrector lens is aspherical.

39. An optical access device for a moving optical storage media, comprising:
   a flying lens near an outer surface of said media; and
   an objective lens spaced from the flying lens, said flying lens and objective lens co-operating to substantially offset a variable range of spherical aberration occurring in said media.

40. The lens of claim 39 wherein an inner surface of said flying lens is approximately planar, and in which an outer surface of said flying lens is convex.

41. The lens of claim 40 wherein the outer surface of said flying lens is spherical.

42. The lens of claim 40 wherein the outer surface of said flying lens is aspherical.

43. The device of claim 39 wherein said objective lens is aspherical.

44. An optical access device for a moving optical storage media, comprising:
   a flying lens near an outer surface of said media; and
   an objective lens spaced from the flying lens, said flying lens and objective lens co-operating to substantially offset a variable range of negative spherical aberration occurring in said media by forming a positive spherical aberration which substantially cancels said negative spherical aberration, and to substantially focus on a given data layer of the media.

45. The lens of claim 44 wherein an inner surface of said flying lens is approximately planar, and in which an outer surface of said flying lens is convex.

46. The lens of claim 45 wherein the outer surface of said flying lens is spherical.

47. The lens of claim 45 wherein the outer surface of said flying lens is aspherical.

48. An optical access device for a moving removable or fixed optical storage media, comprising:
   a flying lens maintained at a substantially constant distance from an outer surface of said media;
   an objective lens spaced from the flying lens, said flying lens and objective lens co-operating to substantially offset a variable negative spherical aberration occurring in said media by forming a positive spherical aberration which substantially cancels said negative spherical aberration; and
   a moving device for moving the objective lens relative to said flying lens.

49. An optical access device for a moving removable or fixed optical storage media, comprising:
   a flying lens maintained at a nearly constant distance away from an outer surface of said media;
   an air bearing system with a slider having the flying lens recessed from an inner surface of the slider, said flying lens having an inner generally planar surface, and an outer convex surface; and an aspherical objective lens spaced from the flying lens, said flying lens and objective lens co-operating to substantially offset a variable negative spherical aberration occurring in said media by forming a positive spherical aberration which substantially cancels said negative spherical aberration.

50. The device of claim 49 wherein said slider has a tapered leading end.

51. The device of claim 49 wherein said convex outer surface of the flying lens is spherical.

52. The device of claim 49 wherein said convex outer surface of the flying lens is aspherical.

53. The device of claim 49 further comprising a moving device for moving the objective lens relative to said flying lens.

54. The device of claim 49 further comprising a device for preloading said slider towards the outer surface of said media.

55. An optical access device for a moving optical storage media, comprising:

a flying lens maintained at a substantially constant distance away from an outer surface of said media;

a slider having the flying lens recessed from an inner or outer surface of said slider;

a device for preloading the slider towards the outer surface of the media, said flying lens having an inner generally planar surface, and an outer convex surface, said slider having a tapered leading end;

an aspherical objective lens spaced from the flying lens, said flying lens and objective lens co-operating to substantially offset a variable negative spherical aberration occurring in said media by forming a positive spherical aberration which substantially cancels said negative spherical aberration; and a device for moving the objective lens relative to said flying lens.

56. The device of claim 55 wherein said outer surface of the flying lens is spherical.

57. The device of claim 55 wherein said outer surface of the flying lens is aspherical.

58. A method of accessing a moving optical storage media, comprising the steps of:

directing a beam of light into said media; and offsetting a variable range of negative spherical aberration occurring in said media by forming a positive spherical aberration of reflected light from said media which substantially cancels said negative spherical aberration.

59. A method of accessing a moving optical storage media, comprising the steps of:

flying a corrector lens at a nearly constant distance away from an outer surface of said media to pass light and correct for spherical aberration; and passing light received from said corrector lens through an objective lens to further correct for spherical aberration.

60. The method of claim 59 including the step of moving said objective lens relative to said corrector lens to access different depths in a storage region of said media.

61. A method of accessing a moving optical storage media, comprising the steps of:

flying a corrector lens at a nearly constant distance away from an outer surface of said media to pass light and correct for spherical aberration in the media; and passing light received from said corrector lens through an objective lens to correct for spherical aberration and focus on a given data layer in the media.

62. The method of claim 61 including the step of moving said objective lens relative to said corrector lens to access different depths in a storage region of said media.

63. A method of accessing a removable or fixed optical storage media, comprising the step of:

flying a corrector lens at a nearly constant distance from an outer surface of said media, said distance being dependent upon the speed of said media.

64. An optical access device, comprising:

an optical storage media having an outer surface and being capable of motion; and a flying lens, as corrector lens, facing said outer surface of said media and being spaced from said outer surface of the media a distance dependent upon the speed of said media relative to said flying lens.

65. The device of claim 64 further comprising an air bearing system with a slider carrying said flying lens.

66. The device of claim 65 in which the flying lens is recessed from an inner surface of said slider, and in which the said inner surface of said slider contacts the media when the media is not in motion.

67. The device of claim 64 wherein the flying lens is positioned at a substantially constant distance from said media for a given constant speed of said media.

68. The device of claim 64 further comprising a device for preloading said flying lens towards said outer surface of the media.

69. The device of claim 64 wherein said media comprises a disk being capable of rotation.

70. An optical access device for a moving optical storage media comprising, a slider with an air bearing system positioned adjacent an outer surface of said media, said slider retaining a flying lens, and having a beveled end disposed in an opposite direction relative to the direction of motion of said media, wherein a bevel of said end being located adjacent an inner surface of said slider facing said outer surface of said media.

71. The device of claim 70 wherein said lens is recessed from the inner surface of said slider.

72. The device of claim 70 further comprising a device to preload said slider towards the outer surface of said media.

73. The device of claim 72 wherein said preload device comprises a suspension system having a leaf spring.

74. The device of claim 70 wherein said media comprises a rotating disc, and in which said beveled end is disposed in an opposite direction to the direction of the rotation of said disk.

75. An optical access device for a moving optical storage medium comprising, a lens assembly having a corrector lens and an objective lens positioned to simultaneously correct for spherical aberration associated with said medium and to focus on a selected data layer in said medium.

76. An optical access device for a moving optical storage media having a data storage region of multiple depths and a protective layer over said storage region comprising, a flying lens, and an objective lens, wherein the objective to flying lens spacing corrects for dynamic spherical aberration, and the objective to flying lens at nominal spacing corrects for fixed spherical aberration.

77. The device of claim 76 further comprising a device for moving the objective lens relative to said flying lens.

78. An optical access device for a moving storage media, comprising:

a flying lens near an outer surface of said media; and an objective lens spaced from the flying lens, said flying lens and objective lens co-operating to cancel spherical aberration, said objective lens having an optimal thickness, and an actual thickness which may be greater than or less than the optimal thickness.

79. The device of claim 78 wherein the range of thickness is about 30 µm greater than or less than said optimal thickness.

80. An optical data generator for a moving optical storage media having opposed outer surfaces, comprises:
   a first flying lens near a first of said opposed outer surfaces of the media;
   a first objective lens spaced from the first flying lens;
   a second flying lens near a second opposed outer surface of the media; and
   a second objective lens spaced from the second flying lens.

81. The generator of claim 80 wherein the media comprises a disk.

82. The generator of claim 80 including a light source which passes a beam to the first objective lens, and a mirror which reflects the light received from the second objective lens.

83. The generator of claim 80 further comprising a source of a light beam, a first auxiliary lens intermediate the light source and the first objective lens, a mirror on an opposed side of the media relative to the light source and spaced from the second objective lens, and a second auxiliary lens intermediate the mirror and the second objective lens.

84. A method of accessing a moving optical storage medium, comprising the steps of:
   generating a beam of light from a light source;
   passing said beam from said light source through an objective lens;
   passing said beam from said objective lens through a corrector lens;
   reflecting said beam from said corrector lens off a data storage layer in said medium;
   passing said beam reflected from said medium through said corrector lens; and
   passing said beam from said corrector lens to a detector which is responsive to light.

* * * * *